(12) United States Patent  
Oliver et al.

(10) Patent No.: US 8,495,121 B2
(45) Date of Patent: Jul. 23, 2013

(54) ARITHMETIC PROCESSING DEVICE AND METHODS THEREOF

(75) Inventors: David S. Oliver, Longmont, CO (US); Debjit Das Sarma, San Jose, CA (US); Scott Hilker, Campbell, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1194 days.

(21) Appl. No.: 12/275,004

(22) Filed: Nov. 20, 2008

(65) Prior Publication Data

US 2010/0125620 A1 May 20, 2010

(51) Int. Cl.
*G06F 7/48* (2006.01)
(52) U.S. Cl.
USPC .......................................................... 708/501
(58) Field of Classification Search
None
See application file for complete search history.

(56) References Cited

U.S. PATENT DOCUMENTS

| | | | |
|---|---|---|---|
| 5,241,493 A * | 8/1993 | Chu et al. ..................... 708/501 |
| 5,268,855 A | 12/1993 | Mason et al. | |
| 5,631,859 A | 5/1997 | Markstein et al. | |
| 5,787,025 A | 7/1998 | Muwafi et al. | |
| 6,697,832 B1 * | 2/2004 | Kelley et al. ................... 708/501 |
| 6,842,765 B2 | 1/2005 | Enekel et al. | |
| 7,124,160 B2 | 10/2006 | Saulsbury et al. | |
| 7,421,465 B1 * | 9/2008 | Rarick et al. .................. 708/490 |
| 7,451,172 B2 * | 11/2008 | Powell et al. ................. 708/501 |
| 8,106,914 B2 | 1/2012 | Oberman et al. | |
| 2003/0126174 A1 | 7/2003 | Kawata | |
| 2004/0199561 A1 | 10/2004 | Brooks et al. | |
| 2005/0027773 A1 | 2/2005 | Machnicki et al. | |
| 2007/0185953 A1 | 8/2007 | Prokopenko et al. | |
| 2007/0260662 A1 | 11/2007 | Dockser | |
| 2010/0125621 A1 | 5/2010 | Oliver et al. | |

OTHER PUBLICATIONS

Non-final Office Action mailed Jun. 15, 2012 for U.S. Appl. No. 12/274,996, David S. Oliver et al., 7 pages.
Final Office Action mailed Oct. 11, 2012 for U.S. Appl. No. 12/274,996, David S. Oliver et al., 10 pages.

* cited by examiner

*Primary Examiner* — David H Malzahn

(57) ABSTRACT

A device and methods are disclosed for communicating an unrounded result from one arithmetic calculation for use in a second, subsequent calculation. For example, an unrounded result of a first calculation can be forwarded to provide a multiplier, a multiplicand or an addend operand for the subsequent operation. The operand can be forwarded to the input of the same fused multiply addition module (FMAM) that supplied the result, or to another FMAM, and do so without regard to the precision of the forwarded operand, the precision of the subsequent operation, or the native precision of the FMAM.

19 Claims, 3 Drawing Sheets

FIG. 3

|  | B | | | |
|---|---|---|---|---|
| A | SP | DP | EP | PS |
| SP | +B • 2⁴⁰ _3102_<br>+A • 2⁴⁰ _3104_<br>+B • 2⁴⁰<br>+A • 2⁴⁰<br>+1 • 2⁸⁰ _3106_<br><u>310</u> | +B • 2⁴⁰<br>+A • 2¹¹<br>+B • 2⁴⁰<br>+A • 2¹¹<br>+1 • 2⁵¹ _3126_<br><u>312</u> | +B • 2⁴⁰<br>+A<br>+B • 2⁴⁰<br>+A<br>+1 • 2⁴⁰<br><u>314</u> | |
| DP | +B • 2¹¹<br>+A • 2⁴⁰<br>+B • 2¹¹<br>+A • 2⁴⁰<br>+1 • 2⁵¹<br><u>316</u> | +B • 2¹¹<br>+A • 2¹¹<br>+B • 2¹¹<br>+A • 2¹¹<br>+1 • 2²²<br><u>318</u> | +B • 2¹¹<br>+A<br>+B • 2¹¹<br>+A<br>+1 • 2¹¹<br><u>320</u> | |
| EP | +B<br>+A • 2⁴⁰<br>+B<br>+A • 2⁴⁰<br>+1 • 2⁴⁰<br><u>322</u> | +B<br>+A • 2¹¹<br>+B<br>+A • 2¹¹<br>+1 • 2¹¹<br><u>324</u> | +B<br>+A<br>+B<br>+A<br>+1<br><u>326</u> | |
| PS | KEY: | UNROUNDED A OPERAND SUBSEQUENTLY ROUNDED UP<br><br>UNROUNDED B OPERAND SUBSEQUENTLY ROUNDED UP<br><br>UNROUNDED A AND B OPERAND BOTH SUBSEQUENTLY ROUNDED UP | | AL   +BL<br>AH   +BL • 2⁴⁰ _3282_<br>BL   +AL<br>BH   +AH • 2⁴⁰ _3284_<br>AL & BL   +BL<br>    +AL<br>    +1<br>AH & BH   +AH • 2⁴⁰<br>    +BH • 2⁴⁰<br>    +1 • 2⁸⁰ _3286_<br><u>328</u> |

ARITHMETIC PROCESSING DEVICE AND METHODS THEREOF

CROSS REFERENCE TO RELATED APPLICATIONS

Application Ser. No. 12/274,996, filed of even date herewith, entitled "ARITHMETIC PROCESSING DEVICE AND METHODS THEREOF" by David Oliver, Debjit DasSarma, and Scott Hilker and hereof is incorporated by reference as if fully set forth herein.

BACKGROUND

1. Field of the Disclosure

The present disclosure relates generally to data processing devices, and more particularly to arithmetic processing devices.

2. Description of the Related Art

A data processor device may include a specialized arithmetic processing unit such as an integer or floating-point processing device. Floating-point arithmetic is particularly applicable for performing tasks such as graphics processing, digital signal processing, and scientific applications. A floating-point processing device generally includes devices dedicated to specific functions such as multiplication, division, and addition for floating point numbers.

A floating-point processing device typically supports arithmetic operations for one or more number formats, such as single-precision, double-precision, and extended-precision formats. For each format, the floating point processor computations typically are performed in a pipelined manner, and require a number of clock cycles to complete. The pipeline efficiency can by improved by bypassing a stage of the pipeline, such as a rounding stage of the pipeline, and forwarding the incomplete result directly back to the input of same floating-point processing device for use in a subsequent operation.

BRIEF DESCRIPTION OF THE DRAWINGS

The present disclosure may be better understood, and its numerous features and advantages made apparent to those skilled in the art by referencing the accompanying drawings.

FIG. 3 includes a table illustrating correction terms that are realized using the multiplexor and carry-save adder of FIG. 2 in accordance with a specific embodiment of the present disclosure.

The use of the same reference symbols in different drawings indicates similar or identical items.

DETAILED DESCRIPTION

A device and methods are disclosed for communicating an unrounded result from one arithmetic calculation for use in a second, subsequent calculation. For example, an unrounded result of a first calculation can be forwarded to provide a multiplier, a multiplicand or an addend operand for the subsequent operation. The operand can be forwarded to the input of the same fused multiply addition module (FMAM) that supplied the result, or to another FMAM, and do so without regard to the precision of the forwarded operand, the precision of the subsequent operation, or the native precision of the FMAM.

Figure 1:
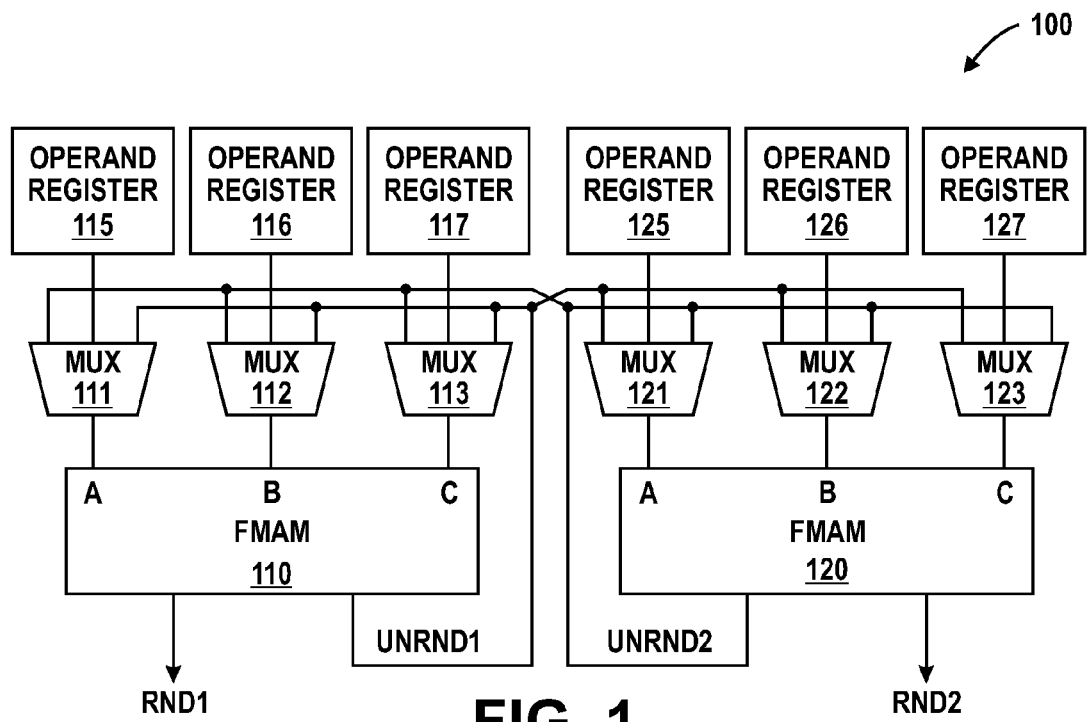
FIG. 1 illustrates in block diagram form an arithmetic processing device in accordance with a specific embodiment of the present disclosure.

FIG. 1 illustrates in block diagram form an arithmetic processing device 100 in accordance with a specific embodiment of the present disclosure. Arithmetic processing device 100 includes an FMAM 110, an FMAM 120, multiplexors 111, 112, 113, 121, 122, and 123, operand registers 115, 116, 117, 125, 126, and 127.

Register 115 has an output. Multiplexor 111 has a first input connected to the output of register 115, a second input to receive a signal labeled "UNRND1," a third input to receive a signal labeled "UNRND2," and an output. Register 116 has an output. Multiplexor 112 has a first input connected to the output of register 116, a second input to receive signal UNRND1, a third input to receive signal UNRND2, and an output. Register 117 has an output. Multiplexor 113 has a first input connected to the output of register 117, a second input to receive signal UNRND1, a third input to receive signal UNRND2, and an output. FMAM 110 has a first input connected to the output of multiplexor 111, a second input connected to the output of multiplexor 112, a third input connected to the output of multiplexor 113, a first output to provide a signal labeled "RND1," and a second output to provide signal UNRND1.

Register 125 has an output. Multiplexor 121 has a first input connected to the output of register 125, a second input to receive a signal labeled "UNRND2," a third input to receive a signal labeled "UNRND1," and an output. Register 126 has an output. Multiplexor 122 has a first input connected to the output of register 126, a second input to receive signal UNRND2, a third input to receive signal UNRND1, and an output. Register 127 has an output. Multiplexor 123 has a first input connected to the output of register 127, a second input to receive signal UNRND2, a third input to receive signal UNRND1, and an output. FMAM 120 has a first input connected to the output of multiplexor 121, a second input connected to the output of multiplexor 122, a third input connected to the output of multiplexor 123, a first output to provide a signal labeled "RND2," and a second output to provide signal UNRND2.

FMAM 110 is an arithmetic processing device that can execute arithmetic instructions such as multiply, add, subtract, and multiply-add. FMAM 110 and 120 can each receive three inputs, A, B, and C. Inputs A and B can receive a multiplicand and a multiplier, respectively, and input C can receive an addend. To execute a multiply-add instruction, such as floating-point multiply-accumulate (FMAC), inputs A and B are multiplied together to provide a product, and input C is added to the product. A multiply instruction, such as a floating-point add (FMUL), is executed in substantially the same way except input C is set to a value of zero. An add instruction, such as a floating-point add (FADD) is executed in substantially the same way except operand B is set to a value of one. Each of FMAM 110 and 120 include an output to provide a rounded result and another output to provide an unrounded result. FMAM 110 and 120 can provide the unrounded result one cycle or one pipeline stage earlier than the rounded result.

Both FMAM 110 and FMAM 120 are implemented as pipelined data paths and are compliant with IEEE-754 floating-point standards. Each of FMAM 110 and 120 can perform extended, double, and single-precision operations. Each can also perform two single-precision operations in parallel using a "packed-single" format, in which case two single-precision results are calculated simultaneously.

For purposes of discussion herein, a floating-point number includes a significand (mantissa) and an exponent. For example, the floating-point number $1.1011010*2^{15}$ has a significand of 1.1011010 and an exponent of 15. The most significant bit of the mantissa, to the left of the binary point, is referred to as a "implicit bit." A floating-point number is generally presented as a normalized number, where the implicit bit is a one. For example, the number $0.001011*2^{23}$ can be normalized to $1.011*2^{20}$ by shifting the mantissa to the left until a "1" is shifted into the implicit bit and decrementing the exponent by the same amount that the mantissa was shifted. A floating-point number will also include a sign bit that identifies the number as a positive or negative number. The exponent can also represent a positive or negative number, but a bias value is added to the exponent so that no exponent sign bit is required.

For purposes of discussion, it is assumed that the mantissa of a single-precision number has twenty-four bits of precision, a double-precision number has fifty-three bits of precision, and an extended-precision number has 64 bits of precision. A packed-single format contains two individual single-precision values. The first, (low) value includes a twenty-four bit mantissa that is right justified in the 64-bit operand field, and the second (high) value includes another twenty-four bit mantissa that is left justified in the 64-bit operand field, with sixteen zeros between the two single-precision values.

Each of FMAM 110 and 120 include datapaths that operate on the mantissa and exponent portions of the floating-point operands in a substantially parallel manner. Each data path is implemented using a five-stage pipeline. During the first pipeline stage, the exponent of the product is calculated, and the multiply operation begins. During the second pipeline stage, the multiply and addition operation are completed to a point where the intermediate result is expressed in a two part redundant format. These two values are referred to as the sum and carry portions of the intermediate result.

It is further assumed that each of FMAM 110 and 120 employ a multiplier module that uses a radix-4 Booth recoding technique generate thirty-three partial products based on the multiplier and multiplicand. The multiplier module implements the multiply operation with a series of five levels of addition operations using a Wallace tree. The Wallace tree receives thirty-two partial products, while the thirty-third partial product is processed along with the addend. The first level of addition operations reduces the thirty-two partial products to sixteen partial products using eight 4:2 compressor devices. The second level of addition operations further reduces the sixteen partial products down to eight using four 4:2 compressor devices; the third level reduces these eight down to four partial products using two 4:2 compressor devices, and the fourth level reduces these four down to two partial products using one 4:2 compressor device. The fifth level reduces the final 2 partial products along with the addend operand to produce an intermediate multiply-add result. This operation will be described in greater detail with reference to FIG. 2. The first two levels of partial product reduction are included in the first pipeline stage subsequent to the booth encoding and 33 partial product generation. The three remaining levels of partial product reduction are included in the second pipeline stage. Furthermore, the exponents of the product and the addend are compared and the larger is selected to provide a preliminary exponent of the result during the second pipeline stage.

During the third pipeline stage, the intermediate multiply-add result (sum and carry) is presented to a carry-propagate adder (CPA), which calculates an un-normalized and unrounded result. The intermediate result is also presented to a leading-zero-anticipator (LZA), which predicts the number of leading zeros in the mantissa of the result, to allow normalization to occur immediately once the CPA result is known. During the fourth pipeline stage, this result is normalized, and during the fifth pipeline stage, the normalized result is rounded. Signals UNRND1 and UNRND2 represent the unrounded results calculated during pipeline stage four, and signals RND1 and RND2 represent the final rounded results calculated during pipeline stage five.

Arithmetic processing device 100 includes two FMAM modules 110 and 112 that can operate in parallel. FMAM 110 can receive three operands (or three sets of two operands in the case of a packed-single format), and FMAM 120 can receive three additional operands (or three sets of two operands in the case of a packed-single format). Multiplexor 111 can select one of three sources for the A operand(s) for FMAM 110. The first source is contained in register 115, which can represent a data value stored in a register file or a final rounded result, such as RND1 or RND2. The second source is the forwarded unrounded result UNRND1 provided my FMAM 110. The third source is the forwarded unrounded result UNRND2 provided by FMAM 120. Multiplexor 112 can select three sources for the B operand(s) of FMAM 110, and multiplexor 113 can select three sources for the C operand(s). The operation of FMAM 120 is substantially the same as FMAM 110. A forwarded unrounded result can be referred to as a "bypassed operand" because the rounding stage has been bypassed.

For simplicity, the following description is presented in the context of single, double, or extended-precision formats, but unless specifically stated otherwise, operation using the packed-single format is substantially the same, except two single-precision operations are performed simultaneously.

Each of FMAM 110 and 120 can receive any combination of three rounded or unrounded operands, and the same operand can be provided to any or all operand inputs of a particular FMAM. For example, FMAM 110 can perform a floating-point multiply-accumulate instruction based on three unique rounded operands provided by registers 115, 116, and 117. As another example, a rounded A operand can be provided by register 115, an unrounded B operand can be provided by FMAM 110, and an unrounded C operand can be provided by FMAM 120. As still another example, an operation can receive an unrounded result (N) from FMAM 120 and use that result for the A, B, and C operand to calculate the result $N^2+N$.

In an embodiment, the forwarded unrounded result that can be of any precision and can be forwarded for use in an operation of another precision. In another embodiment, packed-single unrounded results can only be forwarded to another packed-single operation, since forwarding to a single, double, or extended operation would not be numerically meaningful.

For purposes of discussion, it is assumed that FMAMs 110 and 120 can each implement four rounding modes, as specified in IEEE-754. In each case, the rounded result is either truncated, equal to the unrounded result, or it is incremented by one. Therefore, when an unrounded result is used as an operand to a subsequent operation, that operand is either correct (i.e. it is equivalent to the final rounded value), or it is one less than the final rounded value. When the unrounded result differs from the final rounded value, FMAM 110 and 120 can begin an operation based on unrounded operands to determine an intermediate result, and adjust the intermediate result based on the rounded final value to determine a final result. In one embodiment, FMAM 110 and 120 perform these adjustments, if required, during the second pipeline stage.

For example, a multiply operation can begin with an unrounded multiplicand. The unrounded multiplicand can subsequently be rounded up resulting in a value "A." Accordingly, the intermediate result based on the unrounded multiplicand will be equivalent to [(A−1)*B], which is equal to [(A*B)−B]. In order to correct the result, a copy of operand B can be added to the incomplete result and the correct result, [A*B], is obtained. If a multiply operation begins with an unrounded multiplier, that is subsequently rounded up to a value "B", the intermediate result will be equivalent to [A*(B−1)], which is equal to [(A*B)−A]. In order to correct the result, a copy of operand A can be added to the incomplete result and the correct result, [A*B], is obtained.

If a multiply operation begins with an unrounded result, N, that is used for both a multiplicand, and a multiplier, and the N is subsequently rounded up, the intermediate result is equivalent to [(A−1)*(B−1)], which is equal to [(A*B)−AB−1]. Since A=B, this equation can be simplified to [(A*A)−2A+1]. Therefore, in order to correct the result, a value of [2A−1]=[(A−1)+(A−1)+1] can be added to the incomplete result and the correct result, [A*A], is obtained. Note that (A−1) is the actual value of the original unrounded result. If a multiply operation begins with two unrounded operands A and B, and both operands are subsequently rounded up, the calculation that is underway is actually [(A−1)*(B−1)]= [(A*B)−B−A+1]. Therefore, in order to correct the result, a value of [B+A−1]=[(A−1)+(B−1)+1] can be added to the incomplete result and the correct result [A*B] is obtained.

If an unrounded addend, operand C, is used in an addition or a multiply operation, the exponent of the unrounded operand is used to calculate an alignment shift amount. The alignment shift amount is calculated by subtracting the exponent of the addend from the exponent of the product, including a bias value, and determines how to shift the addend mantissa to correctly align with product mantissa. In an embodiment, the unrounded mantissa is not used in the calculation because the rounded result is available by the time it is needed during the second pipeline stage. In the event that the mantissa of the unrounded result is all ones, and is rounded up, the mantissa is allowed to grow one bit left, leaving it as 10.000 . . . instead of normalizing it to 1.000 . . . , so the unrounded (not incremented) exponent is still valid. The exponent is incremented before being used in other subsequent operations. This exponent increment can be accomplished without extraordinary processing as it is not critical to affecting the latency (or device count) of the FMAM unit.

Because unrounded results that are supplied to a subsequent operation can represent numbers encoded in a precision (single, double, or packed-single) that is different from the precision of the subsequent operation, the correction terms described previously must be shifted to align with corresponding bits of the incomplete result. For example, if an unrounded double-precision multiplicand, operand A, is forwarded to a double-precision multiply operation, and operand A is subsequently rounded up, then a correction of [(B*2^1)] is required. This correction value can be determined by shifting the B operand left by 11 bit positions.

An unrounded mantissa is a sixty-four bit value, [63:0]. A single-precision unrounded mantissa is left justified in this value, aligned with bits [63:40]. A double-precision unrounded mantissa is left justified in this value, aligned with bits [63:11]. An extended-precision unrounded mantissa uses all bit positions, [63:0]. A packed single-precision unrounded result includes a high value and a low value. The high value is aligned with bit positions [63:40], the low value is aligned with bit positions [23:0], and bit positions [39:24] are padded with zeros. The product provided by the multiplier of FMAM 110 or FMAM 120 is a 128-bit value, [127:0].

When an operation includes an unrounded result as an A or B operand, and the unrounded result is subsequently rounded up, the least significant bit of the correction value must aligned with the least significant bit (LSB) of the multiplier product, and the correction value is shifted to accomplish this. For example, if an unrounded single-precision result if forwarded as an A operand (24 bits), and an unrounded double-precision result is forwarded as a B operand (53 bits), the product will be (24+53=77) bits in size and will be left justified in the 128-bit product and aligned with bits [127:51]. If the unrounded single-precision result is subsequently rounded up, then a correction value of "+B" is indicated. The LSB of the B operand is at bit position 11, so the B operand value needs to be shifted 40 bits to the left, shifting the LSB from bit position 11 to bit position 51 to correspond with the LSB of the multiply product. The addition of the correction values, along with any required shifting of the correction values, is described with reference to FIG. 2.

Figure 2:
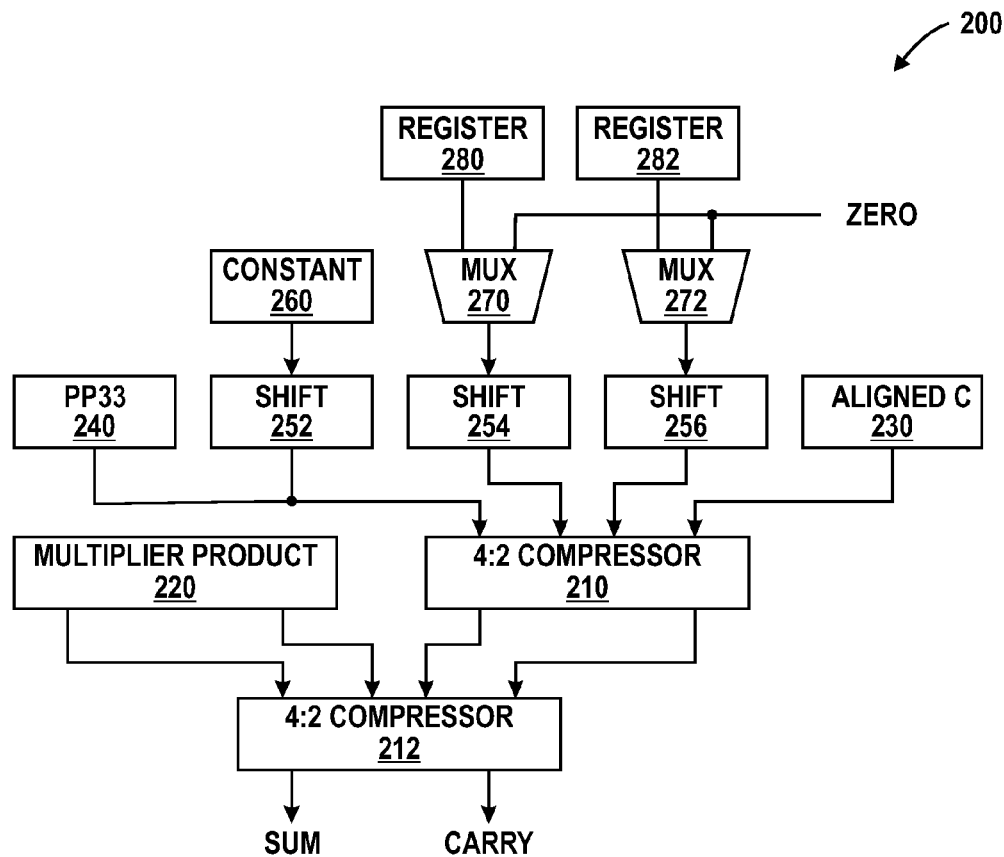
FIG. 2 illustrates in block diagram form unrounded bypass correction logic of FMAM 110 or 120 of FIG. 1 in accordance with a specific embodiment of the present disclosure.

FIG. 2 illustrates in block diagram form a particular embodiment of unrounded bypass correction logic 200 of FMAM 110 or 120 of FIG. 1. Unrounded bypass correction logic 200 calculates an intermediate multiply-add result by adding the final two partial products received from the multiplier Wallace tree, the addend operand, and correction terms and partial product 33. Unrounded bypass correction logic 200 includes a 4:2 compressor 210, a 4:2 compressor 212, a multiplier product 220, an aligned C operand 230, a thirty-third partial product 240, shift modules 252, 254, and 256, a constant generator 260, multiplexor 270 and 272, and registers 280 and 282.

Constant generator 260 and registers 280 and 282 each has an output. Shift module 252 has an input connected to the output of constant generator 260, and an output. Multiplexor 270 has a first input connected to the output of register 280, a second input to receive a value of zero, and an output. Shift module 254 has a first input connected to the output of multiplexor 270, and an output. Multiplexor 272 has a first input connected to the output of register 282, a second input to receive a value of zero, and an output. Shift module 256 has a first input connected to the output of multiplexor 272, and an output.

Thirty-third partial product 240 and aligned C operand each have an output. 4:2 CSA 210 has a first input connected to the output of thirty-third partial product 240 and to the output of shift module 252, a second input connected to the output of shift module 254, a third input connected to the output of shift module 256, a fourth input connected to the output of aligned C operand 230, a first output, and a second output. Multiplier product 220 has a first output and a second output. 4:2 CSA 212 has a first input connected to the first output of multiplier product 220, a second input connected to the second output of multiplier product 220, a third input connected to the first output of 4:2 CSA 210, a fourth input connected to the second output of 4:2 CSA 210, a first output and a second output.

Constant generator 260 can provide a constant of either zero or one, the selection of which is based upon the specific correction to be provided. Shift module 252 can shift the constant by zero, eleven, twenty-two, forty, fifty-one, or eighty bit positions to the left. Register 280 can contain a copy of an operand. Multiplexor 270 can provide this operand, or a zero constant, to shift module 254, the selection of which is based upon the specific correction to be provided. Register 282 can also contain a copy of an operand. Multiplexor 272 can provide this operand, or a zero constant, to shift module 256, the selection of which is based upon the specific correction to be provided. Shift modules 254 and 256 can shift their respective operands by zero, eleven, or forty bit positions to the left.

4:2 compressors 210 and 212 can be referred to as 4:2 compressors because each CSA receives 4 values and produces two results. As previously described, the multiplier uses a Wallace tree where partial products provided by the Booth encoder are successively compressed. Thirty-two of these are reduced to sixteen, to eight, to four, and to two, using four levels of 4:2 CSA devices. The final two multiply partial products are the outputs of multiplier product 220.

4:2 compressor 210 receives 1) the thirty-third partial product provided by the Booth encoder, labeled "PP33," concatenated with the correction constant from shift module 252, 2) the correction operand from shift modules 254, 3) the correction operand from shift module 256, and 4) the aligned C operand 230, to produce a sum and a carry result. These two results are added to the final multiplier product terms 220 using 4:2 compressor 212 to provide a final 128-bit sum and 128-bit carry value that are supplied to a carry-propagate adder (not shown) and to a leading-zero-anticipator (not shown). The carry-propagate adder produces the final unnormalized and unrounded mantissa.

If a correction term requires a copy of the A operand, independent of whether the operand was a rounded or a unrounded result, the operand can be received from registers 280 or 282, and the operand can be shifted by shift modules 254 or 256, respectively. A copy of the B operand can be provided in the same way. In an embodiment, the aligned C operand is always the rounded operand, even if an unrounded version was initially forwarded to the current operation to determine an initial result exponent. Thus, all indicated corrections can be performed by unrounded bypass correction logic 200, including +0, +A, +B, +1, or combinations thereof, and each correction term can be appropriately shifted based upon the precision of the forwarded operand(s).

FIG. 3 includes a table illustrating correction terms that are realized using the multiplexor and carry-save adder logic 200 of FIG. 2. Table 300 is a matrix that includes 10 supported combinations of operand precision that can be provided to the multiplicand or multiplier operands of a multiply or multiply-accumulate operation. The vertical axis represents an A operand and includes a set of rows respectively indicating the precision format associated with the A operand. In particular, the set of rows are associated, from top to bottom, with single-precision, double-precision, extended-precision, and packed-single-precision formats. The horizontal axis represents a B operand and includes a set of columns respectively indicating the precision format associated with the A operand. The set of columns are associated, from left to right, with single-precision, double-precision, extended-precision, and packed single-precision. Nine cells, 310, 312, 314, 316, 318, 320, 322, 324, and 326, represent all nine possible precision format combinations of operands A and B. For the illustrated embodiment of FIG. 3, it is assumed that an unrounded packed-single operand can only be forwarded to a packed-single operation that will provide a packed-single result, because a packed-single operand contains two distinct single-precision numbers. Cell 328 includes correction values for operations using packed single format operands. In particular, in the packed single format, operand A can include two packed values, labeled "$A_H$" and "$A_L$" respectively. Similarly, in the packed single format, operand B can include two packed values, labeled "$B_H$" and "$B_L$" respectively. Cell 328 illustrates correction values that are indicated when any of $A_H$, $A_L$, $B_H$, and $B_L$ are forwarded, and subsequently rounded up.

Cell 310 illustrates correction values indicated if an unrounded single-precision result is forwarded to the A operand, an unrounded single-precision result is forwarded to the B operand, or both. Cell 312 illustrates correction values indicated if an unrounded single-precision result is forwarded to the A operand, an unrounded double-precision result is forwarded to the B operand, or both. Cell 314 illustrates correction values indicated if an unrounded single-precision result is forwarded to the A operand, an unrounded extended-precision result is forwarded to the B operand, or both. Cell 316 illustrates correction values indicated if an unrounded double-precision result is forwarded to the A operand, a single-precision result is forwarded to the B operand, or both. Cell 318 illustrates correction values indicated if an unrounded double-precision result is forwarded to the A operand, an unrounded double-precision result is forwarded to the B operand, or both. Cell 320 illustrates correction values indicated if an unrounded double-precision result is forwarded to the A operand, an unrounded extended-precision result is forwarded to the B operand, or both. Cell 322 illustrates correction values indicated if an unrounded extended-precision result is forwarded to the A operand, an unrounded single-precision result is forwarded to the B operand, or both. Cell 324 illustrates correction values indicated if an unrounded extended-precision result is forwarded to the A operand, an unrounded double-precision result is forwarded to the B operand, or both. Cell 326 illustrates correction values indicated if an unrounded extended-precision result is forwarded to the A operand, an unrounded extended-precision result is forwarded to the B operand, or both.

Each of cells 310, 312, 314, 316, 318, 320, 322, 324, 326, and 328, are divided into 3 sub-cells. For example, cell 310 includes sub-cells 3102, 3104, and 3106. The top sub-cell, such as sub-cell 3102, is the correction value that is indicated when an unrounded result is forwarded to the A operand of an operation, and the result is subsequently rounded up. The middle sub-cell, such as sub-cell 3104, is the correction value that is indicated when an unrounded result is forwarded to the B operand of an operation, and the result is subsequently rounded up. The bottom sub-cell, such as sub-cell 3106, is the correction value that is indicated when an unrounded result is forwarded to both the A operand and the B operand of an operation, and both of the results are subsequently rounded up. No correction is indicated if the operation receives no bypassed operands or if a bypassed operand is not subsequently rounded up.

For example, sub-cell 3102 specifies a correction value that is indicated if an unrounded single-precision result is forwarded to the A operand of a multiply operation and that result is subsequently rounded up after it was forwarded. In this case, the correction value indicated is to add the B operand, shifted forty bit positions to the left, to the intermediate multiply result. Referring to FIG. 2, this can be accomplished by providing the B operand to register 280, configuring multiplexor 270 to pass that value to shift module 254, and configuring shift module 254 to shift the value to the left by forty bit positions. Multiplexor 272 can be configured to select a value of zero, and constant generator 260 also can be configured to provide a value of zero. Thus, a value equal to the B operand multiplied by $2^{40}$ can be added to the intermediate result using 4:2 CSA 210, thereby correcting the result. A number can be multiplied by $2^N$ by shift the number to the left by N bit positions.

Sub-cell 3104 specifies a correction value that is indicated if an unrounded single-precision result is forwarded to the B operand of a multiply operation and that result is subsequently rounded up after it was forwarded. In this case, the correction value indicated is to add the A operand, shifted forty bit positions to the left, to the intermediate multiply result. Referring to FIG. 2, this can be accomplished by providing the A operand to register 282, configuring multiplexor 272 to pass that value to shift module 256, and configuring shift module 256 to shift the value to the left by forty bit positions. Multiplexor 270 can be configured to select a value of zero, and constant generator 260 also can be configured to provide a value of zero. Thus, a value equal to the A operand multiplied by $2^{40}$ can be added to the intermediate result, correcting the result.

Sub-cell 3106 specifies a correction value that is indicated if unrounded single-precision results are forwarded to both the A and the B operand of a multiply operation and both results are subsequently rounded up after they were forwarded. In this case, the correction value indicated is to add the B operand, shifted forty bit positions to the left, add the A operand, shifted forty bit positions to the left, and add a constant of a value of one, shifted eighty bit positions to the left, to the intermediate multiply result. Referring to FIG. 2, this can be accomplished by providing the B operand to register 280, configuring multiplexor 270 to pass that value to shift module 254, and configuring shift module 256 to shift the value to the left by forty bit positions. Operand A can be provided to register 282, multiplexor 272 configured to pass that value to shift module 256, and shift module 256 configured to shift the value to the left by forty bit positions. Constant generator 260 can be configured to provide a constant of value one to shift module 252, and shift module 252 configured to shift that value to the left by eighty bit positions. Thus, a value equal to the B operand multiplied by $2^{40}$, the A operand multiplied by $2^{40}$, and one times $2^{80}$ can be added to the intermediate result, correcting the result.

Note that one unrounded result can be forwarded to both the A and B operand. For example, an unrounded result N can be forwarded to the A and the B operands of a multiply operation, the result being $N^2$. If the forwarded result is subsequently rounded, correction values illustrated in table 300 apply. For example, referring to cell 3106, a corrected result can be obtained by adding a value of N (the A operand) multiplied by $2^{40}$, N (the B operand) multiplied by $2^{40}$, and one times $2^{80}$ to the intermediate result.

Sub-cell 3126 specifies a correction value that is indicated if an unrounded double-precision result is forwarded to the A operand and an unrounded single-precision result is forwarded to the B operand of a multiply operation and both results are subsequently rounded up after they were forwarded. In this case, the correction value indicated is to add the B operand, shifted forty bit positions to the left, add the A operand, shifted eleven bit positions to the left, and add a constant of a value of one, shifted fifty-one bit positions to the left, to the intermediate multiply result.

Cell 328 specifies correction values that may be indicated when one or both unrounded packed single-precision result operands are forwarded to a subsequent packed-single multiply operation. Each packed-single operand includes two unique numbers, and one, both, or neither may be subsequently rounded up after they have been forwarded to an operation.

For example, sub-cell 3282 specifies a correction value that is indicated if a packed single-precision result is forwarded to the A operand of a multiply operation, and either the low or the high single-precision portion is subsequently rounded up after they are forwarded. If the low single-precision result is rounded up, the correction value indicated is to add the low portion of the B operand to the intermediate multiply result. If the high single-precision result is rounded up, the correction value indicated is to add the low portion of the B operand, shifted forty bit positions to the left, to the intermediate multiply result.

Sub-cell 3284 specifies a correction value that is indicated if a packed single-precision result is forwarded to the B operand of a multiply operation, and either the low or the high single-precision portion is subsequently rounded up after they are forwarded. If the low single-precision result is rounded up, the correction value indicated is to add the low portion of the A operand to the intermediate multiply result. If the high single-precision result is rounded up, the correction value indicated is to add the low portion of the A operand, shifted forty bit positions to the left, to the intermediate multiply result.

Sub-cell 3286 specifies a correction value that is indicated if packed single-precision results are forwarded to both the A and the B operands of a multiply operation, and either the low or the high single-precision portion of both of the operand are subsequently rounded up after they are forwarded. If the low single-precision results are rounded up, the correction value indicated is to add the low portion of the B operand, add the low portion of the A operand, and add a constant of a value of one to the low portion of the intermediate multiply result. If the high single-precision results are rounded up, the correction value indicated is to add the high portion of the B operand, shifted forty bit positions to the left, add the high portion of the A operand, shifted forty bit positions to the left, and add a constant of a value of one, shifted eighty bit positions to the left, to the high portion of the intermediate multiply result.

Figure 4:
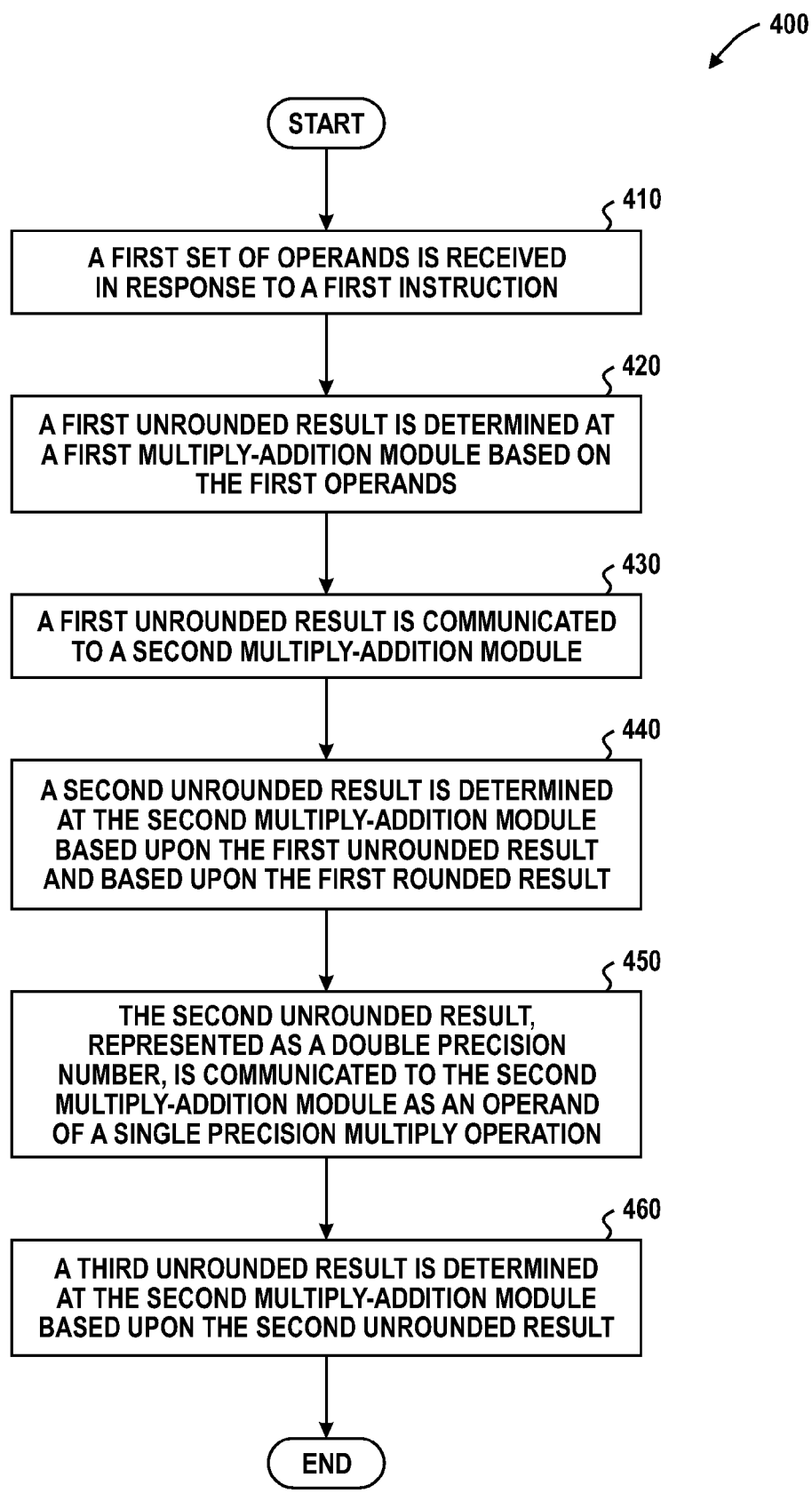
FIG. 4 is a flow diagram illustrating a method in accordance with a specific embodiment of the present disclosure.

FIG. 4 is a flow diagram 400 illustrating a method in accordance with a specific embodiment of the present disclosure. At block 410, a first set of operands is received in response to a first instruction, such as a multiply, add, or multiply-accumulate instruction. At block 420, a first unrounded result is determined at a first multiply-addition module based upon the first operands. At block 430, the first unrounded result is communicated to a second multiply-addition module because the first unrounded result is an operand of a subsequent instruction being executed in the second multiply-addition module. At block 440, a second unrounded result is determined at the second multiply-addition module based upon the first unrounded result and based upon the first rounded result. The calculation of the second unrounded result began with the first unrounded operand, and an intermediate form of the second unrounded result was corrected based on whether the first unrounded result was subsequently rounded up.

At block 450, the second unrounded result, represented as a double-precision number, is communicated to the second multiply-addition module as an operand of a single-precision multiply operation. At block 460, a third unrounded result is determined at the second multiply-addition module based upon the second unrounded result. One, two, or three unrounded results can be forwarded as operands to a FMAM, such as FMAM 110. Each unrounded result can be formatted as a single, double, or extended-precision value, and the operation that is receiving the unrounded results can be a single, double, or extended-precision operation. Unrounded results that are formatted as packed single-precision numbers can be forwarded to another packed-single operation. Unrounded results can be forwarded back to the input of the FMAM that is providing the unrounded result, or to another FMAM.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

For example, generic multiply, multiply-accumulate, and add operations can include variations such as multiply-add, negate multiply add, multiply subtract, and subtract. Implementation details such as the number of pipeline stages and how and when the correction value is applied are illustrated for the purpose of example, and skilled artisans will appreciate that methods disclosed can be implemented in other ways. For example, correction terms or addend can be applied after the multiply product resulting from the unrounded operands is complete, rather than concurrent with the final stages of the multiply operation. Furthermore, the methods are applicable to other arithmetic devices and are not limited to floating-point arithmetic devices.

Arithmetic processing units FMAM 110 and FMAM 120 receive two multiply operands and one addition operand, but the methods disclosed herein can be applied to other arithmetic processing units with a different number of multiplication and addition datapaths. Whereas FMAM 110 and FMAM 120 can support single, double, extended, and packed single-precision number formats, other formats or variations of these formats can be supported. Other arithmetic operations such as divide, square root, as well as transcendental operations, may also be supported by FMAM 110 and FMAM 120.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method, comprising:
   receiving, in a register, a first operand in response to a first instruction;
   determining at a first multiply-addition module of a processor a first unrounded result based on the first operand, the first unrounded result having a first precision; and
   communicating the first unrounded result to a second multiply-addition module of the processor to perform an arithmetic operation having a second precision different than the first precision.

2. The method of claim 1, further comprising:
   determining at the first multiply-addition module a first rounded result based on the first operand; and
   communicating the first rounded result to the second multiply-addition module.

3. The method of claim 2, further comprising:
   determining a second unrounded result at the second multiply-addition module based on the first unrounded result and a second operand.

4. The method of claim 3, wherein determining the second unrounded result comprises determining the second unrounded result based on the first rounded result.

5. The method of claim 3, further comprising:
   communicating the second unrounded result to the first multiply-addition module in response to determining the second unrounded result.

6. The method of claim 3, further comprising:
   communicating the second unrounded result to an input of the second multiply-addition module in response to determining the second unrounded result.

7. The method of claim 3, further comprising:
   communicating the second unrounded result to a third multiply-addition module in response to determining the second unrounded result.

8. The method of claim 1, wherein the first precision is a single-precision and the second precision is a double-precision.

9. The method of claim 1, wherein the first precision is a single-precision type and the second precision is an extended-precision.

10. The method of claim 1, wherein the first precision is a double-precision and the second precision is an extended-precision.

11. A method, comprising:
    receiving, in a register, an unrounded result from one of a plurality of multiply-addition modules of a processor, the unrounded result of a first precision type;
    receiving a first operand of a second precision type different from the first precision type; and
    determining a first multiply-addition result at a first multiply-addition module, the first multiply-addition result based on the unrounded result and the first operand.

12. The method of claim 11, wherein the first multiply-addition module corresponds to the one of the plurality of multiply-addition modules.

13. The method of claim 11, wherein the one of the plurality of multiply-addition modules corresponds to a second multiply-addition module of the plurality of multiply-addition modules.

14. The method of claim 11, wherein the first operand is a single-precision type and the unrounded result is a double-precision type.

15. The method of claim 11, wherein the first operand is a single-precision type and the unrounded result is an extended-precision type.

16. The method of claim 11, wherein the first operand is a double-precision type and the unrounded result is an extended-precision type.

17. A device comprising:
    a register configured to receive a first operand in response to a first instruction;
    a first multiply-addition module comprising an input coupled to the register, a first output configured to provide a first unrounded result based on the first operand, and a second output configured to provide a first rounded result based on information received at the input, the first unrounded result having a first precision; and
    a second multiply-addition module comprising an input coupled to the first output of the first multiply-addition module and a first output configured to provide a second rounded result based on information received at the input, the second rounded result having a second precision different from the first precision.

18. The device of claim 17, wherein the second multiply-addition module further comprises a second input coupled to the first output of the first multiply-addition module, and wherein the first output of the second multiply-addition module is configured to provide a second rounded result based on information received at the second input.

19. The device of claim 17, wherein the second multiply-addition module further comprises a second output coupled to the input of the first multiply-addition module, the second output configured to provide an unrounded result based on information received at the input of the second multiply-addition module.

* * * * *